United States Patent
Panga et al.

(10) Patent No.: US 7,789,146 B2
(45) Date of Patent: Sep. 7, 2010

(54) SYSTEM AND METHOD FOR LOW DAMAGE GRAVEL PACKING

(75) Inventors: Mohan K. R. Panga, Stafford, TX (US); Balkrishna Gadiyar, Katy, TX (US); Ryan Hartman, Arlington, MA (US); Bruno Drochon, Houston, TX (US); John W. Still, Katy, TX (US); Bryan Stamm, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 155 days.

(21) Appl. No.: 12/124,910

(22) Filed: May 21, 2008

(65) Prior Publication Data
US 2009/0025932 A1 Jan. 29, 2009

Related U.S. Application Data

(60) Provisional application No. 60/951,780, filed on Jul. 25, 2007.

(51) Int. Cl.
*E21B 43/04* (2006.01)
(52) U.S. Cl. .................... 166/278; 166/51; 166/300; 507/925
(58) Field of Classification Search .............. 166/278
See application file for complete search history.

(56) References Cited

U.S. PATENT DOCUMENTS

| | | | | |
|---|---|---|---|---|
| 2,193,775 | A * | 3/1940 | Stratford | 166/278 |
| RE24,570 | E * | 11/1958 | Mangold et al. | 106/672 |
| 2,905,245 | A | 9/1959 | De Priester | |
| 3,434,540 | A | 3/1969 | Stein | |
| 3,675,717 | A * | 7/1972 | Goins et al. | 166/278 |
| 4,051,900 | A * | 10/1977 | Hankins | 166/280.2 |
| 5,095,987 | A | 3/1992 | Weaver | |
| 5,333,689 | A * | 8/1994 | Jones et al. | 166/278 |
| 5,415,228 | A * | 5/1995 | Price et al. | 166/278 |
| 5,492,178 | A * | 2/1996 | Nguyen et al. | 166/276 |
| 5,518,996 | A | 5/1996 | Maroy | |
| 5,629,271 | A * | 5/1997 | Dobson et al. | 507/269 |
| 6,742,590 | B1 | 6/2004 | Nguyen | |
| 7,004,255 | B2 * | 2/2006 | Boney | 166/280.2 |
| 7,261,157 | B2 | 8/2007 | Nguyen | |

(Continued)

FOREIGN PATENT DOCUMENTS

GB 2277543 2/1994

*Primary Examiner*—George Suchfield
(74) *Attorney, Agent, or Firm*—David G. Matthews; Rodney V. Warfford

(57) ABSTRACT

A method is disclosed for low damage gravel packing. The method includes combining a carrier fluid, a first amount of particulates, and a second amount of particulates into a slurry. The first amount of particulates have a first average size distribution and the second amount of particulates have a second average size distribution, and the first average size distribution is at least three times larger than the second average size distribution. The slurry includes particles which are at least partially degradable material, and with reactive solid constituents. The reactive solid reacts with the degradable material and/or a hydrolysis product of the degradable material. The method further includes positioning a screen in a wellbore, and circulating the slurry through the wellbore such that the first amount of particulates and the second amount of particulates are deposited on an outer surface of the screen.

38 Claims, 6 Drawing Sheets

U.S. PATENT DOCUMENTS

| | | |
|---|---|---|
| 7,265,079 B2 | 9/2007 | Willberg et al. |
| 7,267,170 B2 | 9/2007 | Mang |
| 7,482,311 B2 | 1/2009 | Willberg et al. |
| 7,559,369 B2 | 7/2009 | Roddy et al. |
| 2004/0106525 A1* | 6/2004 | Willberg et al. ............. 507/200 |
| 2007/0029086 A1* | 2/2007 | East, Jr. ....................... 166/278 |
| 2007/0238623 A1 | 10/2007 | Saini et al. |

* cited by examiner

SYSTEM AND METHOD FOR LOW DAMAGE GRAVEL PACKING

RELATED APPLICATION

This application claims priority to U.S. Provisional Application No. 60/951,780 entitled "FORMATION PERMEABILITY CONTROL FLUIDS HAVING OPTIMIZED PACKING VOLUME FRACTION", filed Jul. 25, 2007. The referenced provisional application is hereby incorporated by reference.

BACKGROUND

The statements in this section merely provide background information related to the present disclosure and may not constitute prior art.

Gravel packs are placed in wellbores between a screen and a formation face and/or casing to prevent formation sand from flowing into the wellbore and to improve wellbore and near-wellbore conductivity. The conductivity at the wellbore and near-wellbore is important because any damage in these locations significantly increases the pressure drop of fluid flow, thereby reducing the producibility or injectivity of the well.

Further, current placement techniques for gravel packs can be a complex procedure requiring several stages and the proper functioning of moving parts in a hostile wellbore environment. Accordingly, there is a demand for further improvements in this area of technology.

SUMMARY

Some embodiments are unique procedures for creating a high solid fraction fluid. Other embodiments include unique systems, methods, and apparatus for low damage gravel packing. Further embodiments, forms, objects, features, advantages, aspects, and benefits shall become apparent from the below description and drawings.

In some embodiments, a slurry of different amounts and sizes of particulates which may formed at least in part of degradable material are combined with a carrier fluid and placed into a well along with a screen. The slurry may be first placed in a wellbore and a screen positioned in the slurry, or vice versa. A reactive solid may be used react with at least one of a degradable particulate and/or a hydrolysis product of the degradable material. Any of the particulates may optionally include a tackifying agent, and/or a coating. Degradable materials may be formed of any suitable material, including, but not limited to: a wax; an oil-soluble resin; a material soluble in hydrocarbons; a lactide; a glycolide; an aliphatic polyester; a poly(lactide; a poly(glycolide; a poly(ε-caprolactone; a poly(orthoester); a poly(hydroxybutyrate); an aliphatic polycarbonate; a poly(phosphazene); a poly(anhydride); a poly(saccharide); dextran; cellulose; chitin; chitosan; a protein; a poly(amino acid); a poly(ethylene oxide); a copolymer including poly(lactic acid) and poly(glycolic acid); a copolymer including a first moiety which may be a hydroxyl group, a carboxylic acid group, or a hydrocarboxylic acid group, and a second moiety which is at least one of glycolic acid and lactic acid; or any combination thereof. The reactive solid may be any suitable material, including, but not limited to, ground quartz, oil soluble resin, degradable rock salt, clay, zeolite, magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, sodium calcium magnesium polyphosphate glass, or any combination of these. The carrier fluid used in embodiments may be a brine, water, or any other suitable aqueous or nonaqueous fluid. The sum of the mass of the particulates may be at least about 20 pounds per gallon of carrier fluid. The carrier fluid may have a viscosifier present in an amount less than about 20 lb per 1000 gallons of carrier fluid, and optionally, the sum of the mass of the particulates is at least about 23 pounds per gallon of incorporated in an effective amount, such as, but not limited to, an amount less than 18 lb gel per 1000 gallons of carrier fluid, and optionally the sum of the mass of the particulates is at least about 23 pounds per gallon of carrier fluid. Any of the above features, taken either alone or in any combination may be used in embodiments. While some embodiments of the invention describe the use of plurality amounts of particulates, the terms "first amount", "second amount", "third amount", and so on, may be meant in some embodiments to also describe the order of use or addition, while in other embodiments, the terms have no correlation to order of use or addition.

In some aspects a slurry is prepared by combining a carrier fluid, a first amount of particulates, a second amount of particulates, and a third amount of particulates, the first amount of particulates have a first average size distribution, the second amount of particulates have a second average size distribution, and the third amount of particulates have a third average size distribution. The first average size distribution is at least three times larger than the second average size distribution, and the second average size distribution is at least three times larger than the third average size distribution. At least one of the second amount of particulates and the third amount of particulates are formed, at least in part, of degradable material and at least one of the second amount of particulates and the third amount of particulates includes a reactive solid. A screen is positioned in a wellbore, the slurry circulated through the wellbore such that the first amount of particulates, the second amount of particulates, and the third amount of particulates are deposited on an outer surface of the screen.

In another aspect, a carrier fluid, a first amount of particulates, and a second amount of particulates are combined into a slurry, where the first amount of particulates have a first average size distribution, the second amount of particulates have a second average size distribution, and the first average size distribution is at least three times larger than the second average size distribution. The slurry is placed into a wellbore a screen lowered into the slurry. The sum of all particulates in the slurry may exceed thirty pounds per gallon of carrier fluid in some embodiments. Also, the first average size distribution may be between about six and ten times larger than the second average size distribution. Further, in some embodiments, the second amount of particulates including a degradable material, and the wellbore is shut in for an effective time period. Optionally, particulates may have a coating structured to degrade within the shut in time period. Further, in some instances, at least one of the first amount of particulates and the second amount of particulates includes a formation face damage removal agent.

In yet another aspect, systems are provided which include a slurry comprising a carrier fluid suspending a first amount of particulates, a second amount of particulates, and a third amount of particulates; the first amount of particulates having a first average size distribution, the second amount of particulates having a second average size distribution, and the third amount of particulates having a third average size distribution. The first average size distribution is between three times and fifteen times larger than the second average size distribution, and the second average size distribution is between three times and fifteen times larger than the third average size distribution. At least one of the second amount of particulates and the third amount of particulates includes a degradable material, and at least one of the second amount of particulates and the third amount of particulates includes a reactive solid. Also included are a screen disposed in a wellbore, and suitable device for depositing the first amount of particulates, the second amount of particulates, and the third amount of particulates between the screen and the wellbore. The carrier fluid may further include a fourth amount of particulates, the fourth amount of with an average size distribution, where the third average size distribution between three times and fifteen times larger than the fourth average size distribution. Optionally, the carrier fluid may further suspend a fifth amount of particulates, the fifth amount of particulates having a fifth average size distribution, and the fourth average size distribution is between three times and fifteen times larger than the fifth average size distribution.

In yet another aspect, a system includes a slurry formed of a carrier fluid suspending a first amount of particulates, a second amount of particulates, and a third amount of particulates. The carrier fluid includes a brine and a viscosifier in an amount less than about 20 lb per 1000 gallons of carrier fluid, and the sum of the mass of the particulates is greater than about 20 pounds per gallon of carrier fluid. The first amount of particulates has a first average particle volume, the second amount of particulates has a second average particle volume, and the third amount of particulates has a third average particle volume. The first average particle volume is between $3^3$ and $15^3$ times larger than the second average particle volume, and the second average particle volume is between $3^3$ and $15^3$ times larger than the third average particle volume. The system further includes a screen disposed in a wellbore and suitable device for depositing the first, second, and third amount of particulates between the screen and a surface of the wellbore. In some embodiments, the first average size distribution is about 840 μm, the second average size distribution about 150 μm, and third average size about 15 μm. Each median size may have a characteristic dimension. The first, second, and third amount of particulates may have a combined dry packing volume fraction greater than 0.75, or even greater than 0.8. The device for depositing the first, second and third amount of particulates between the screen and a surface of the wellbore may also include the ability for positioning the slurry in the wellbore and positioning the screen in the slurry.

In some other embodiments, systems are disclosed which include a slurry formed from a carrier fluid suspending a first, second, and third amount of particulates. The first amount of particulates has a first average size distribution, the second amount, a second average size distribution, and the third amount, a third average size distribution. The first average size distribution is at least three times larger than the second average size distribution, and the second average size distribution is at least three times larger than the third average size distribution. At least one of the second amount of particulates and the third amount of particulates may include a degradable material, and at least one of the second amount of particulates and the third amount of particulates may include a reactive solid structured to react with at least one of the degradable material and a hydrolysis product of the degradable material. The system also includes a screen disposed in a wellbore and device for depositing the first, second, and third amount of particulates between the screen and a surface of the wellbore. The first average size distribution may be between about six time and ten times larger than the second average size distribution. In some cases, at least one of the second amount of particulates and the third amount of particulates include a formation face damage removal agent; and, the formation face damage removal agent may further include an agent to remove at least one damage type selected from gravel pack fluid filter cake, a drilling mud filter cake, a fluid loss agent, and a drilling mud pill residue.

BRIEF DESCRIPTION OF THE FIGURES

This application claims priority to U.S. Provisional Application No. 60/951,780 entitled "FORMATION PERMEABILITY CONTROL FLUIDS HAVING OPTIMIZED PACKING VOLUME FRACTION", filed Jul. 25, 2007. The referenced provisional application is hereby incorporated by reference.

DESCRIPTION OF THE ILLUSTRATIVE EMBODIMENTS

Figure 1:
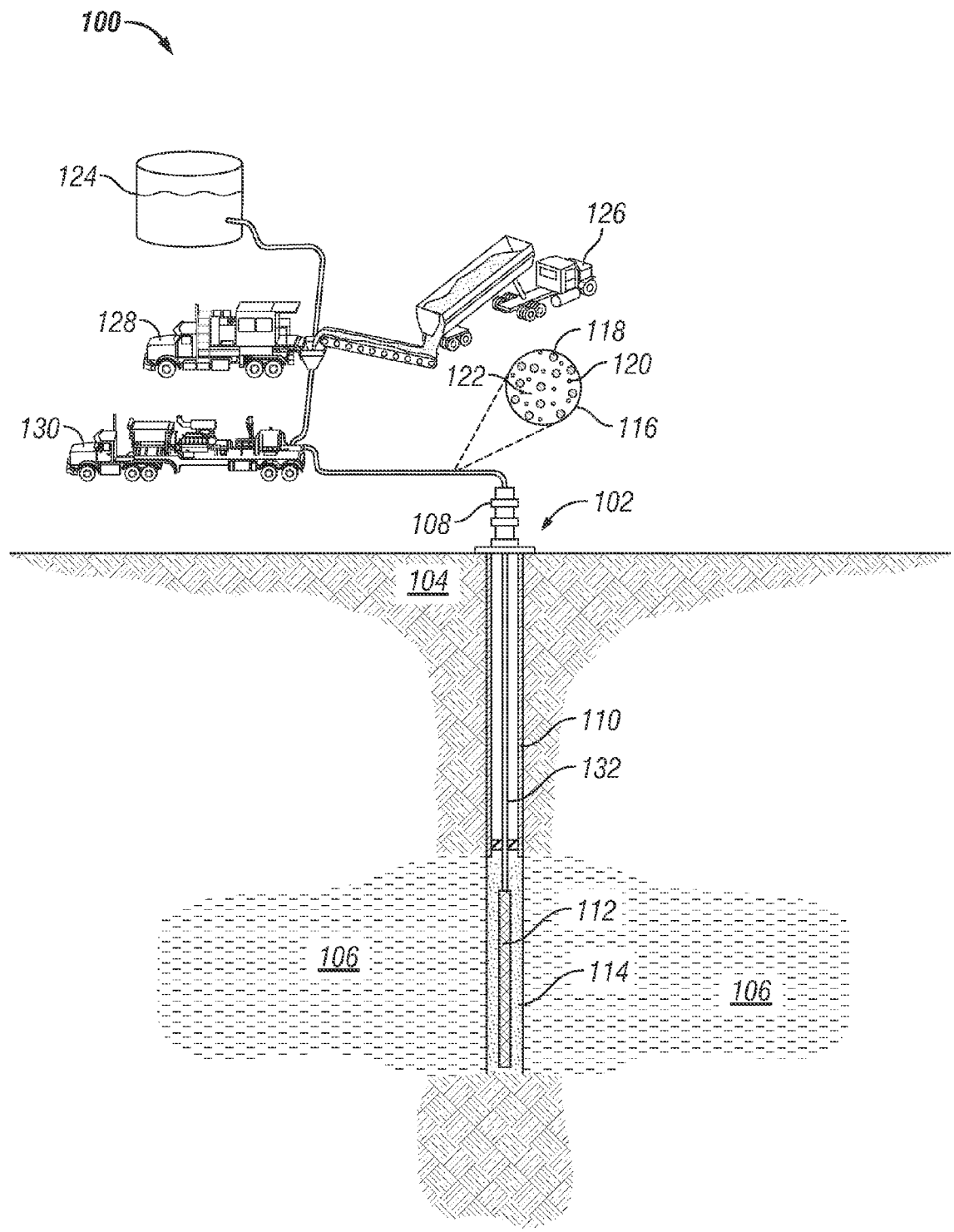
FIG. 1 is a schematic diagram of a system for low damage gravel packing.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and that such further applications of the principles of the invention as illustrated therein as would normally occur to one skilled in the art to which the invention relates are contemplated and protected.

FIG. 1 is a schematic diagram of a system 100 for low damage gravel packing. In certain embodiments, the system 100 includes a well 102 drilled through an overburden 104 and a formation of interest 106. The formation of interest 106 may include a hydrocarbon producing formation, a water producing formation, a target formation for injection of a fluid, or other formation of interest known in the art. In certain embodiments, the well 102 has a wellhead 108, and a casing 110 covering at least a portion of the wellbore. In the illustration of FIG. 1, the wellbore through the formation of interest 106 is an "open hole" completion in a vertical well. Other types of completions are contemplated in the present application, including without limitation: a cased completion, multiple zone completions, and/or a horizontal well or well segment. The casing 110 may include a cement layer (not shown) between the casing 110 and the formation(s) (104, 106). Various other features of the system 100 that are known in the art are not shown or described herein to avoid obscuring aspects of the present application.

The system 100 further includes, in certain embodiments, a screen 112 disposed in the wellbore. The screen 112 may include slots or holes sized to prevent the flow of particles from the formation of interest 106 into the well 102 or to the surface during treatment flowback or production of the well 102. In certain embodiments, the system 100 includes a gravel pack 114 deposited between the screen 112 and the formation of interest 106. The gravel of the gravel pack 114 may be deposited as a portion of a slurry 116 comprising particles (118, 120) and a carrier fluid 122.

In certain embodiments, the slurry 116 includes a first amount of particulates 118 having a first average size distribution and a second amount of particulates 120 having a second average size distribution. In certain embodiments, the first amount of particulates 118 are non-deformable particulates. The average size distribution is determined according to any method understood in the art, at least including a mesh screen size number (e.g. 20/40 sand), a mean particle size, and a median particle size. The average size distributions of the first amount of particulates 118 and the second amount of particulates 120 are selected such that the first average size distribution is between three and fifteen times larger than the second average size distribution. The average size distributions of the first amount of particulates 118 and the second amount of particulates 120 are further selected to prevent migration of formation fines through the gravel pack 114 into the well 102. In certain embodiments, a larger size distribution (e.g. the first size distribution to the second size distribution, or the second size distribution to a third size distribution) is a value between six and ten times larger. Distributions between six and ten times allow maximal packed volume fraction (PVF) values while providing a gravel pack that does not shrink, or lose pack efficiency, if smaller particle sizes are removed.

In certain embodiments, the slurry 116 includes a third amount of particulates (not shown—see FIGS. 5-6 and referencing text for examples) having a third average size distribution, where the second average size distribution is between three and fifteen times larger than the third size distribution. For example, the first average size distribution may be a median size of about 840 µm (micrometer, m-6), the second average size distribution may be a median size of about 150 µm, and the third average size distribution may be a median size of about 15 µm.

In certain embodiments, the slurry 116 includes a fourth and/or a fifth amount of particulates (not shown). The fourth amount of particulates includes a fourth average size distribution that is between three and fifteen times smaller than the third average size distribution. The fifth amount of particulates includes a fifth average size distribution that is between three and fifteen times smaller than the fourth average size distribution.

The median size used herein may be any value understood in the art, including for example and without limitation a diameter of roughly spherical particulates. In certain embodiments, the median size may be a characteristic dimension, which may be a dimension considered most descriptive of the particles for specifying a size distribution range. In certain embodiments, the first amount of particulates have a characteristic dimension, for example and without limitation a median particle diameter, between about 500 µm and 1800 µm. In certain embodiments, the first amount of particulates includes a median particle volume between about $2*10^{-11}$ m$^3$ and $6*10^{-10}$ m$^3$. Other volume ranges will be understood by those of skill in the art to be functional according to the principles described herein, and all relevant values of particles sizes for gravel packing are contemplated herein.

In certain embodiments, each median size is a characteristic dimension, where the ratio of characteristic dimensions between particle sizes (e.g. first amount of particulates compared to second amount of particulates) is proportional to a cube root of a ratio of average particle volumes between particle sizes. For example, the first amount of particulates may have a characteristic dimension of $1.5*10^{-3}$ m and an average particle volume of $5.63*10^{-10}$ m$^3$. The second amount of particulates in the example has an average particle volume between about $1.7*10^{-13}$ m$^3$ to $2.1*10^{-11}$ m, with a characteristic dimension between $1.0*10^{-4}$ m and $5.0*10^{-4}$ m which includes the range from one-third to one-fifteenth the characteristic dimension of the first amount of particulates.

The characteristic dimension is used herein to more clearly indicate that the size selection of the particles in the first and second (and/or third, fourth, and fifth) particulate amounts are independent of the shape of the particles. Therefore, the particle sizes can vary in each particle size step by three to fifteen times in any average linear measure, and/or by $3^3$ times to $15^3$ times (i.e. 27× to 3375×) in any average volumetric measure. The relative sizing of the particulates may meet either the linear criteria 3× to 15×, the volumetric criteria $3^3$× and $15^3$× or both. In certain embodiments, utilizing a narrower range of 5× to 10× (characteristic dimension or linear measure) provides greater settling time improvement and therefore allows higher particulate loadings and/or lower carrier fluid 122 viscosities.

The carrier fluid 122 may be a brine, a fluid including a hydratable gel (e.g. a guar, other polysaccharide, hydroxyethyl-cellulose "HEC", or other gelling agent), an oil or oil-based gel, a viscoelastic surfactant, a fluid with a viscosifier, a foamed or "energized" fluid (e.g. a nitrogen or $CO_2$ based foam), an emulsion (including water or oil in the external phase), or other fluid known in the art. In certain embodiments, the slurry 116 is pumped through the well 102 to deposit the first amount of particulates 118 and the second amount of particulates 120 between the screen 112 and the formation of interest 106. The slurry 116 may be pumped outside the screen 112 into the formation of interest 106 until a screen-out occurs (i.e. the particulates 118, 120 build up to the point where the pressure drop across the gravel pack 114 prevents further pumping), the slurry 116 may be circulated through the well 102 such that the slurry 116 passes from outside the screen 112 to inside the screen 112, thereby depositing the particulates 118, 120 between the screen 112 and the formation of interest 106 and circulating the carrier fluid 122 to the surface. In certain embodiments, the slurry 116 may be placed in the wellbore 102 and the screen 112 lowered into the already-placed slurry 116 such that the particulates 118, 120 in the slurry 116 are thereby deposited between the screen 112 and the formation of interest 106.

In certain embodiments, the mixing of particulates 118, 120 with size ratios as described herein allow high particulate loadings with a low or zero viscosifier loading. In certain embodiments, the carrier fluid 122 includes a brine with no viscosifiers, and the sum of the mass of the particulates (i.e. the first amount, second amount, and/or third amount combined) is at least about 20 pounds per gallon of carrier fluid 122. In certain embodiments, the carrier fluid includes a hydratable gelling agent present in an amount less than "about 20 lb gel per 1000 gallons", for example less than 18 lb gel per 1000 gallons of carrier fluid, and the sum of the mass of the particulates exceeds about 23 pounds per gallon of carrier fluid 122. In certain embodiments, the carrier fluid 122 includes a viscosifier present in an amount less than 20 lb per thousand gallons of carrier fluid 122, and the sum of the mass of the particulates exceeds about 23 pounds per gallon of carrier fluid 122. In certain embodiments, the carrier fluid 122 includes a viscosifier present in an amount less than 20 lb per thousand gallons of carrier fluid 122, and the sum of the mass of the particulates exceeds about 30 pounds per gallon of carrier fluid 122.

The limits for minimum viscosifier loading and maximum particulate loading depend upon factors specific to each system 100 that will ordinarily be understood or controlled by those of skill in the art. For example, the settling time of the particulates 118, 120 in the carrier fluid 122, the viscosity of the carrier fluid 122, the intended pumping rate of the slurry 116, the length of the screen 112 interval wherein the gravel pack 114 is to be placed, the fracture strength of the formation of interest 106, and other factors known to those of skill in the art all contribute to the viscosifier loading required in a particular application. Using only brine as a carrier fluid 122 with the layered particulate sizes 118,120, including a third particulate size, slurries 116 have been developed with particulates exceeding 20 lb per gallon of carrier fluid 122, and in certain applications the particulates can exceed 30 lb per gallon of carrier fluid 122.

In certain embodiments, at least one of the smaller particulate sizes (i.e. the second, third, fourth, and/or fifth amount of particulates) include a degradable material. The inclusion of degradable material allows the particulates to participate in improving suspension of particles in the slurry 116, while allowing the particles to be removed in the gravel pack 114 after placement, and/or to allow the particles to release beneficial chemicals into the gravel pack 114 after placement. For example, the degradation of the particulates may release chemicals that dissolve bridging agents, break crosslinked or polymer-based carrier fluid 122, and/or that attack a filter cake formed.

Examples of degradable materials include, without limitation, wax, oil-soluble resin, materials soluble in hydrocarbons, lactide, glycolide, aliphatic polyester, poly(lactide), poly(glycolide), poly(ε-caprolactone), poly(orthoester), poly(hydroxybutyrate), aliphatic polycarbonate, poly(phosphazene), poly(anhydride), poly(saccharide), dextran, cellulose, chitin, chitosan, protein, poly(amino acid), poly(ethylene oxide), and copolymers including poly(lactic acids) and poly(glycolic acids). In certain embodiments, degradable materials may include a copolymer including a first moiety that is a hydroxyl group, a carboxylic acid group, and/or a hydrocarboxylic acid group, and a second moiety that is a glycolic acid and/or a lactic acid.

In certain further embodiments, at least one of the smaller particulate sizes include a reactive solid that reacts with a hydrolysis product of a degradable material. For example, the second amount of particulates 120 may be a degradable material and the third amount of particulates may be a material that reacts with the hydrolysis product of the second amount of particulates 120, enhancing the rate of degradation of the second amount of particulates 120. In certain embodiments, the reactive solid includes ground quartz, oil soluble resin, degradable rock salt, clay, and/or zeolite. In certain embodiments, the reactive solid includes magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and/or sodium calcium magnesium polyphosphate glass. The degradable materials and reactive solids that enhance degradation may be stored on the same particle, such that reactions do not occur at the surface but begin within the fluids at downhole conditions.

In certain embodiments, at least one of the amount of particulates (i.e. first through fifth) includes an encapsulated breaker that reduces the viscosity of the carrier fluid 122 after placement of the gravel pack 114 reducing permeability damage of the pack 114. In certain embodiments, the carrier fluid 122 includes an emulsion, and at least one of the amount of particulates includes a chemical adapted to assist in breaking the emulsion. In certain further embodiments, the chemical adapted to assist in breaking the emulsion is encapsulated and/or included on a coated particle, such that the chemical is not released to break the emulsion until after the gravel pack 114 is placed. In certain further embodiments, one or more of the amount of particulates comprises coated particles, such that the particles do not begin to degrade and/or release chemicals, breakers, solvents, and/or surfactants until after the gravel pack 114 is placed. Any coating on a particle may be adapted to break down with time, temperature, fluids expected to be encountered in the wellbore, chemicals or reactive solids included on other particles and/or in the carrier fluid 122 that are released under other mechanisms.

In one exemplary embodiment, the carrier fluid 122 comprises an emulsion, the second amount of particulates includes a surfactant that breaks the emulsion and the second amount of particulates are coated with a material that breaks down in the presence of a chemical in the third amount of particulates. In the example, the third amount of particulates includes a coating that degrades in the presence of hydrocarbons (e.g. as produced from the formation of interest 106) that releases the chemical breaking down the coating on the second amount of particulates. Similar configurations of particles, coatings, chemicals, and the like are contemplated in the present application.

In certain embodiments, one or more of the particulates includes a formation face damage removal agent. The formation face may have permeability damage from the gravel pack fluid filter cake, from a fluid loss agent in the gravel pack, from a drilling mud filter cake, from a fluid loss agent in the drilling mud, and/or residual damage from a pill (e.g. a high viscosity pill pumped during drilling to stop fluid loss) pumped during drilling or completion of the wellbore. The damage removal agent may be a chemical (e.g. an acid and/or an oxidizer) structured to remove formation face damage, and/or a physical agent (e.g. particles of a specific shape, size, or material to break an emulsion). The damage removal agent may be any damage removal material known in the art, and may be included in any of the particulates. Further, and without limitation, the damage removal agent may be within a particle that enters the fluid in the wellbore on dissolution, and/or is embedded within a coated particle.

In certain embodiments, the amount of particulates 118, 120 comprise particles having an aspect ratio of less than or equal to one. In certain embodiments, particles with a lower aspect ratio have enhanced surface area per unit volume and enhance degradation and/or reaction rates for the particles. In certain embodiments, the amount of particulates 118, 120 comprise particles having a nano-structure, micro-structure, or mesoporous structure that enhance the surface area of the particles. The structures of the particles may be fractal or non-fractal. In certain embodiments, at least one of the particulates 118, 120 includes a tackifying agent such as a resin-coating.

In certain embodiments, the system 100 includes various devices to control mixing and pumping the slurry 116. In one exemplary embodiment, the system 100 includes at least one fluid tank 124 which contains the carrier fluid 122 and/or a base fluid utilized in the creation of the carrier fluid 122. The exemplary embodiment further includes a gravel carrier 126 which, in one embodiment, provides the first amount of particulates 118 to a blending device 128. The blending device 128 prepares the final slurry 116, for example mixing the gravel fluid 122 and adding the first amount of particulates 118 from the gravel carrier 126, and further adding any additives, the second amount of particulates 120 and/or third amount of particulates. In certain embodiments, more than one particulate amount may be blended and added by the gravel carrier 126 or other device. The blending device 128 further provides the slurry 116 to a pumping device 130 that provides pressurized slurry 116 to the wellhead 108. Other equipment configurations are understood in the art and contemplated herein. For example, and without limitation, the system 100 may include a coiled tubing unit (not shown) in place of one or more pieces of equipment and/or the tubing 132.

Figure 2:
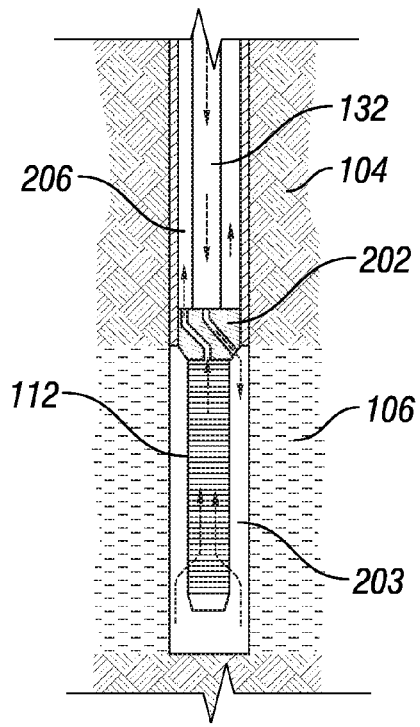
FIG. 2 is a schematic diagram of a device for depositing particulates between an outer surface of a screen and a surface of a wellbore formation.

FIG. 2 is a schematic diagram of a device for depositing particulates 118, 120 in annulus 203 between an outer surface of a screen 112 and a surface of a formation of interest 106. The slurry 116 is pumped through a crossover tool 202 from a tubing 132 to the screen annulus 203. The carrier fluid 122 of the slurry 116 recirculates through the screen 112, depositing the particulates 118, 120 and returning to the surface through a tubing-casing annulus 206. Upon completion of placing the gravel pack 114, the crossover tool 202 is closed, replaced with a production packer, or subjected to other operations as known in the art. The placement of the gravel pack 114 as shown in FIG. 2 is exemplary only.

Figure 3A:
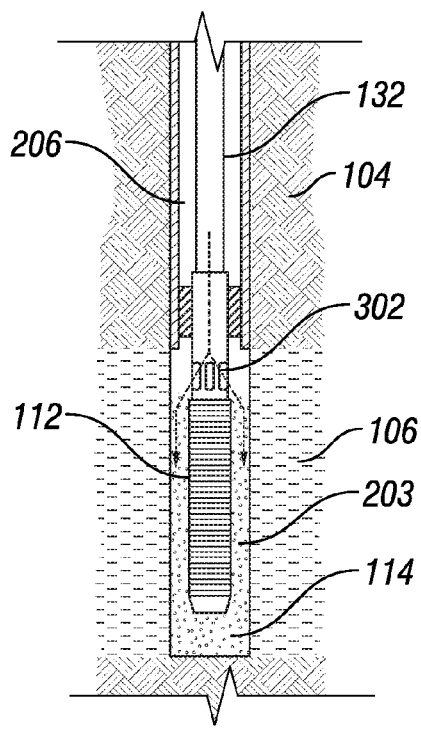
FIG. 3A is a schematic diagram of a device for depositing particulates between an outer surface of a screen and a surface of a wellbore formation in a first position.

FIG. 3A is a schematic diagram of a device for depositing particulates 118, 120 in annulus 203 between an outer surface of a screen 112 and a surface of a formation of interest 106 in a first position. The screen 112 illustrated in FIG. 3A has slots 302 engageable from the surface in some manner. For example the slots 302 may be engageable through electronic signals, hydraulic signals, actuated through a wireline, actuated through force communicated through the tubing 132 (e.g. downward force, upward force, and/or rotational force), and/or through any other operations understood in the art. In the first position as illustrated in FIG. 3A, the slots 302 are open allowing slurry 116 to flow into the screen annulus 203 and thereby deposit particulates 118, 120. As shown in FIG. 3A, the slurry 116 carrier fluid 122 flows into the formation of interest 106, typically at an injecting pressure below the fracturing pressure, until the gravel pack 114 is fully placed.

The arrangement illustrated in FIG. 3A is exemplary only. With certain tools and arrangements the carrier fluid 122 may be returned directly to the surface instead of being injected into the formation of interest 106. For example, the slurry 116 may be pumped down the tubing-casing annulus 206, recirculated through the slots 302 to tubing 132 and returned to the surface. Alternatively, the slurry 116 may be pumped down the tubing 132, forced out of the slots 302 into screen annulus 203 and the carrier fluid recirculated through the screen 112 crossing over into the tubing-casing annulus 206 and returning to the surface. Each of these arrangements is well understood in the art and is not shown in FIG. 3A to avoid obscuring aspects of the present application.

Figure 3B:
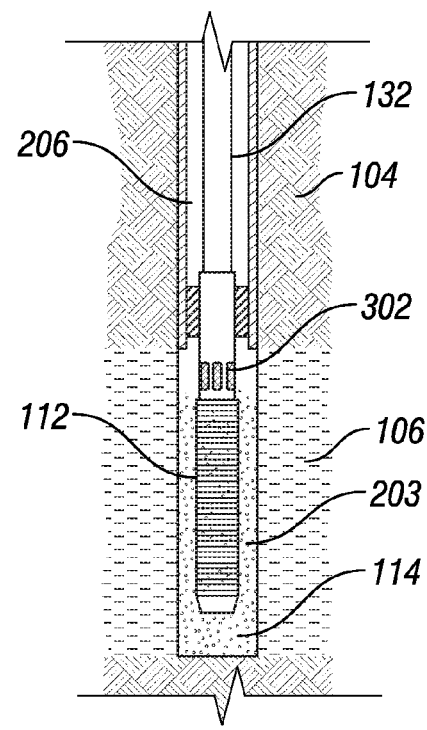
FIG. 3B is a schematic diagram of a device for depositing particulates between an outer surface of a screen and a surface of a wellbore formation in a second position.

FIG. 3B is a schematic diagram of a device for depositing particulates 118, 120 between an outer surface of a screen 112 and a formation of interest 106 in a second position. In the second position as illustrated in FIG. 3B, the slots 302 are closed preventing the flow of carrier fluid 122 or slurry 116 through the slots. In the embodiment illustrated in FIG. 3B, formation fluid coming from the formation of interest 106 flows through the gravel pack 114, screen annulus 203 and screen 112, preventing sand or unconsolidated particulates from the formation of interest 106 from flowing into the wellbore or tubing 132. In the embodiment of FIG. 3B, any particles 118, 120 that may have settled inside the screen 112 may be cleaned out by recirculation (e.g. with a coiled tubing unit) and/or by entrainment within produced fluid from the formation of interest 106.

Figure 4A:
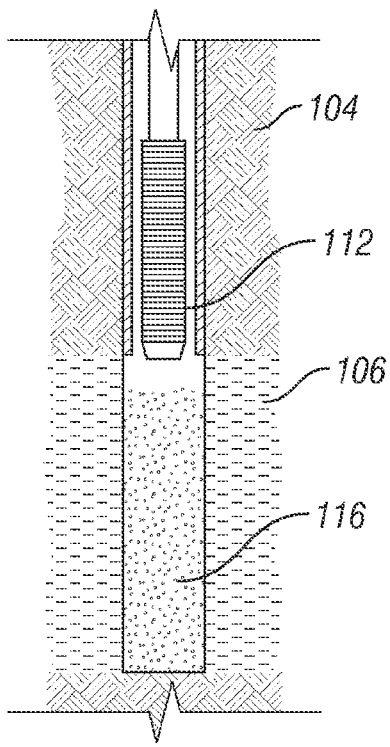
FIG. 4A is a schematic diagram of a device for depositing particulates between an outer surface of a screen and a surface of a wellbore formation in a first position.

FIG. 4A is a schematic diagram of a device for depositing particulates 118, 120 between an outer surface of a screen 112 and a formation of interest 106 in a first position. In the embodiment of FIG. 4A, a specified amount of slurry 116 is placed in the wellbore. The specified amount of slurry 116 depends upon the particulate loading of the slurry, the diameter of the wellbore, the length of the interval to be covered, the displacing volume of the screen 112 (which is lowered into the slurry 116), and similar parameters understood in the art. In certain embodiments, the slurry 116 placed at the bottom of the wellbore has a very high particulate loading, for example in excess of 30 lb of particulates 118, 120 per gallon of carrier fluid 122. The screen 112 in the first position includes the screen 112 not lowered into the slurry 116.

Figure 4B:
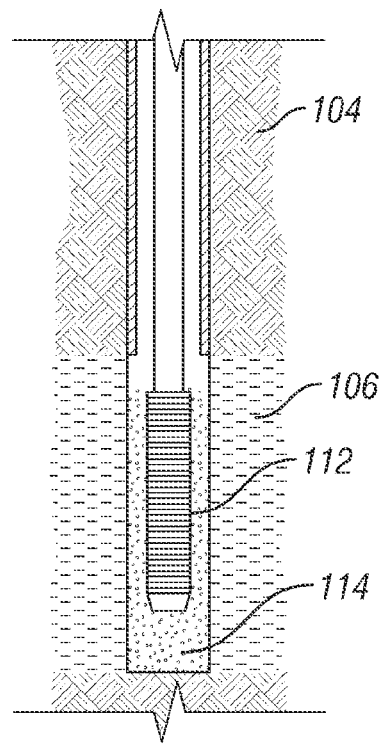
FIG. 4B is a schematic diagram of a device for depositing particulates between an outer surface of a screen and a surface of a wellbore formation in a second position.

FIG. 4B is a schematic diagram of a device for depositing particulates 118, 120 between an outer surface of a screen 112 and a formation of interest 106 in a second position. The screen 112 in the second position includes the screen 112 lowered into the slurry 116. In certain embodiments, the screen 112 may include centralizers such that the screen 112 is approximately centered in the wellbore. However, where the slurry 116 is dense from heavy particulate loading, the screen 112 tends to self-centralize and external centralizers may not be required.

Figure 4C:
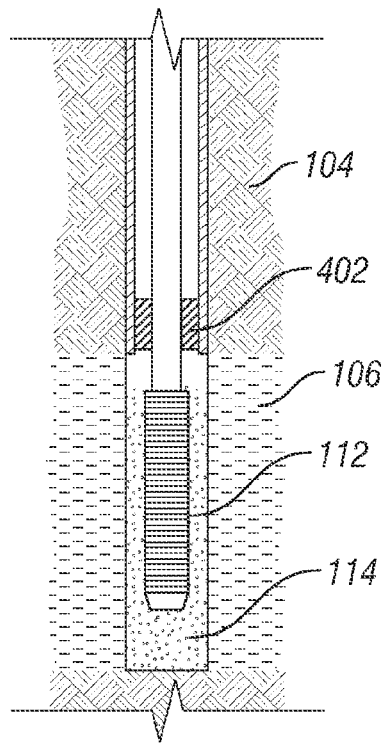
FIG. 4C is a schematic diagram of a device for depositing particulates between an outer surface of a screen and a surface of a wellbore formation in a third position.

FIG. 4C is a schematic diagram of a device for depositing particulates 118, 120 between an outer surface of a screen 112 and a formation of interest in a third position. In the third position, the screen 112 remains in the slurry 116, and production equipment (for example a production packer 402) is placed in the wellbore to prepare the system for production. In certain embodiments, the well is shut in for a specified time period to allow particulates 118, 120 in the slurry 116 to settle, to allow degradable particulates to decompose completely or partially, to allow carrier fluid 122 breakers to act on the carrier fluid 122, and/or to allow particulates with tackifiers to cure (e.g. with resin-coated particulates).

Figure 5:
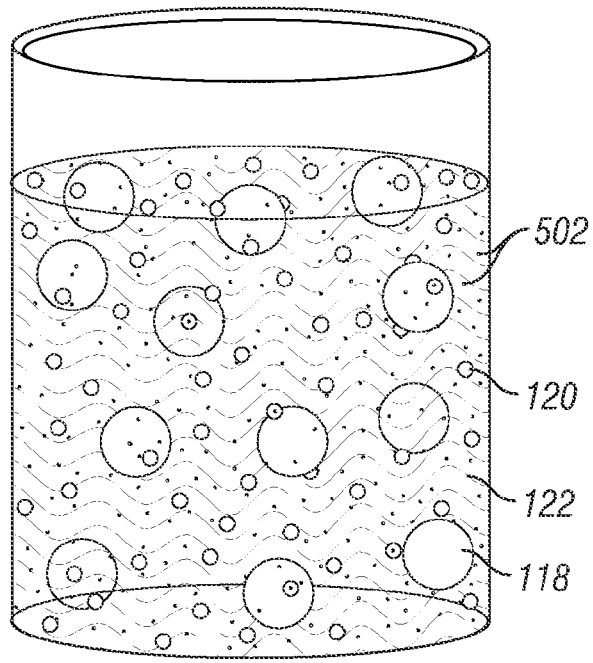
FIG. 5 is an illustration of a carrier fluid combined with a first, second, and third amount of particles in a slurry.

FIG. 5 is an illustration of a carrier fluid 122 combined with a first 118, second 120, and third 502 amount of particles in a slurry 116. The particulates 118, 120, 502 comprise three size regimes, wherein each size regime is three to fifteen times larger than the next smaller size regime. The inclusion of varying size particulates 118, 120, 502, with a high particulate loading, creates a slurry 116 with greatly reduced settling times relative to a slurry 116 with a uniform particle size.

Further, the amount of carrier fluid 122 per unit volume of slurry 116 can be reduced dramatically. For example, spherical particles with a uniform packing arrangement create a packing volume fraction (PVF) of about 0.74, or about 74% of the slurry volume (where particles are suspended rather than dissolved) is particulate matter. Spherical particles with a random packing arrangement create a PVF of about 0.64. By contrast, an arrangement with three particulate sizes having average diameters, in one example, of 840 μm, 150 μm, and 15 μm, respectively, creates a mixture of particles having a PVF of about 0.87. The base densities of the particles 118, 120, 502 may be selected to create a final slurry 116 density at a selected value. An increase in PVF reduces the amount of carrier fluid 122 in the final slurry 116. For example, an increase from 0.64 (random packing) to just 0.80 reduces the amount of carrier fluid 122 in a gallon of slurry by over 50% (i.e. (36-20)/36). The reduced carrier fluid 122 amount reduces the amount of fluid placed in the formation of interest 106 and the amount of viscosifier (if any) in the gravel pack 114, all contributing to a reduction in permeability damage to the formation of interest 106 and a reduction in permeability damage to the gravel pack 114.

Figure 6:
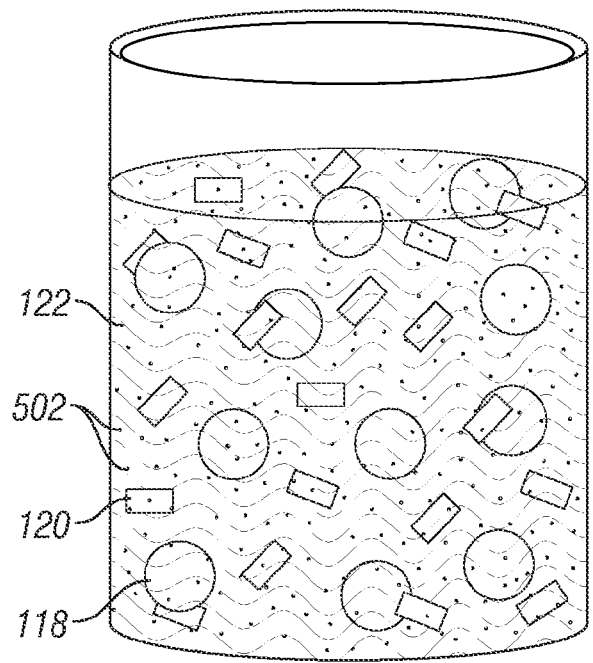
FIG. 6 is an illustration of a carrier fluid combined with a first, second, and third amount of particles in a slurry.

FIG. 6 is an illustration of a carrier fluid 122 combined with a first 118, second 120, and third 502 amount of particles in a slurry. In the illustration of FIG. 6, the second amount of particulates 120 include particulates having an aspect ratio of less than one. The aspect ratio may be defined in any direction desired. In the second amount of particles 120 illustrated in FIG. 6, the particles are elongated, but may comprise flakes, disks, ellipsoids, fibers, or any other particulate shapes known in the art. Any of the first amount of particulates 118, second amount of particulates 120, third amount of particulates 502, the fourth amount of particulates (not shown), and/or the fifth amount of particulates (not shown) may comprise a non-spherical shape. In certain embodiments, the first amount of particulates 118 comprise the primary particulate making up the "gravel," and the first amount of particulates 118 are approximately spherical to maximize permeability of the gravel pack 114.

The schematic flow diagram and related description which follows provides an illustrative embodiment of performing operations for low damage gravel packing. Operations illustrated are understood to be exemplary only, and operations may be combined or divided, and added or removed, as well as re-ordered in whole or part, unless stated explicitly to the contrary herein.

Figure 7:
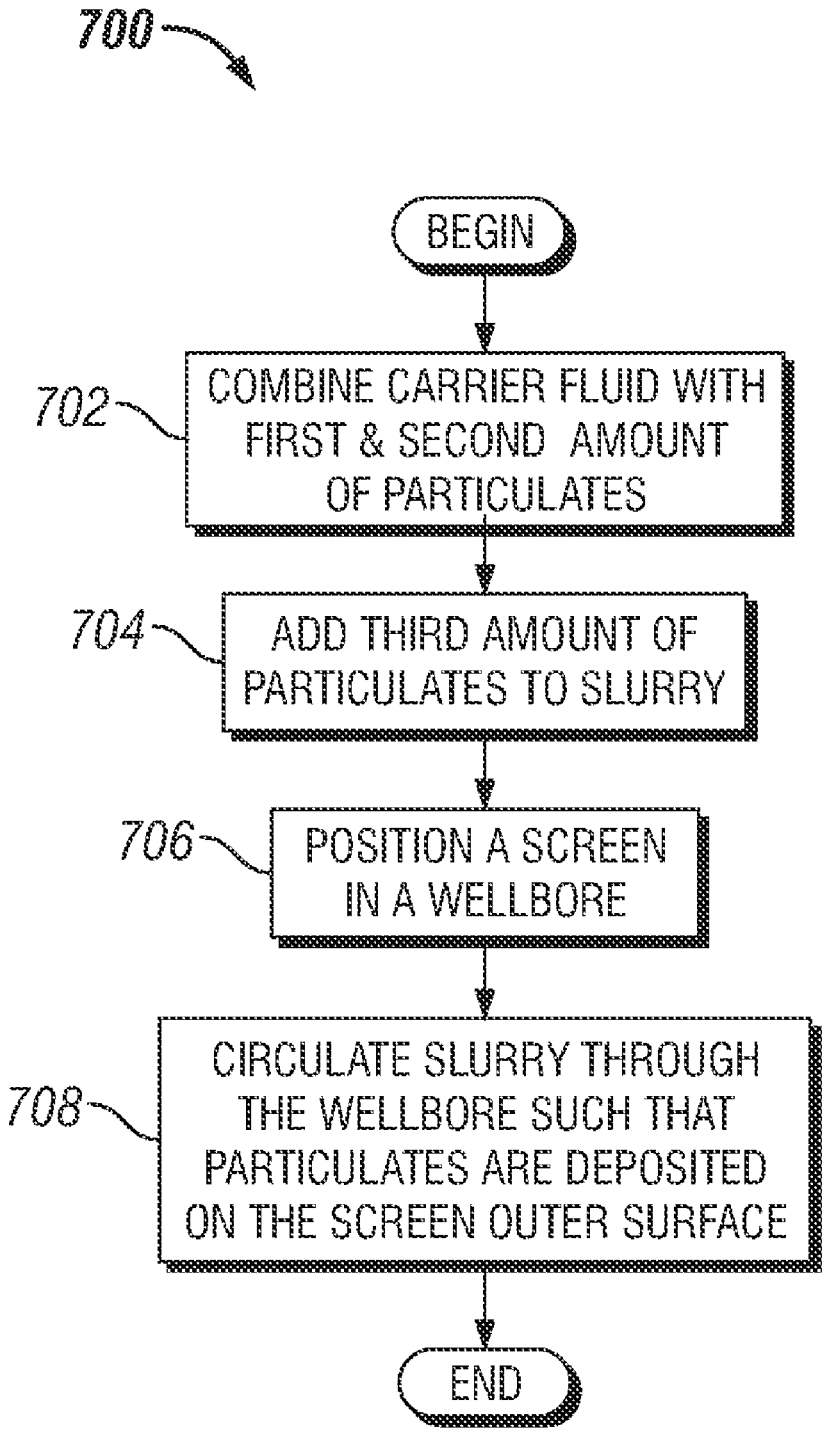
FIG. 7 is a schematic flow diagram of operations for low damage gravel packing.

FIG. 7 is a schematic flow diagram of a procedure 700 for low damage gravel packing. The procedure 700 includes an operation 702 to combine a carrier fluid, a first amount of particulates, and a second amount of particulates into a slurry, where the first amount of particulates have a first average size distribution and the second amount of particulates have a second average size distribution, where the first average size distribution is at least five times larger than the second average size distribution, and where the first amount of particulates comprise non-deformable particulates. In certain further embodiments, the procedure 700 includes an operation 704 to combine a third amount of particulates with the slurry, where the third amount of particulates have a third average size distribution, and where the second average size distribution is at least five times larger than the third average size distribution.

The method 700 further includes an operation 706 to position positioning a screen in a wellbore, and an operation 708 to circulate slurry through the wellbore such that the first amount of particulates and the second amount of particulates are deposited on an outer surface of the screen. In certain embodiments, circulating the slurry through the wellbore comprises flowing the slurry into a formation of interest, and flowing the slurry back out of the formation of interest such that particulates from the slurry are deposited on the outer surface of the screen.

Figure 8:
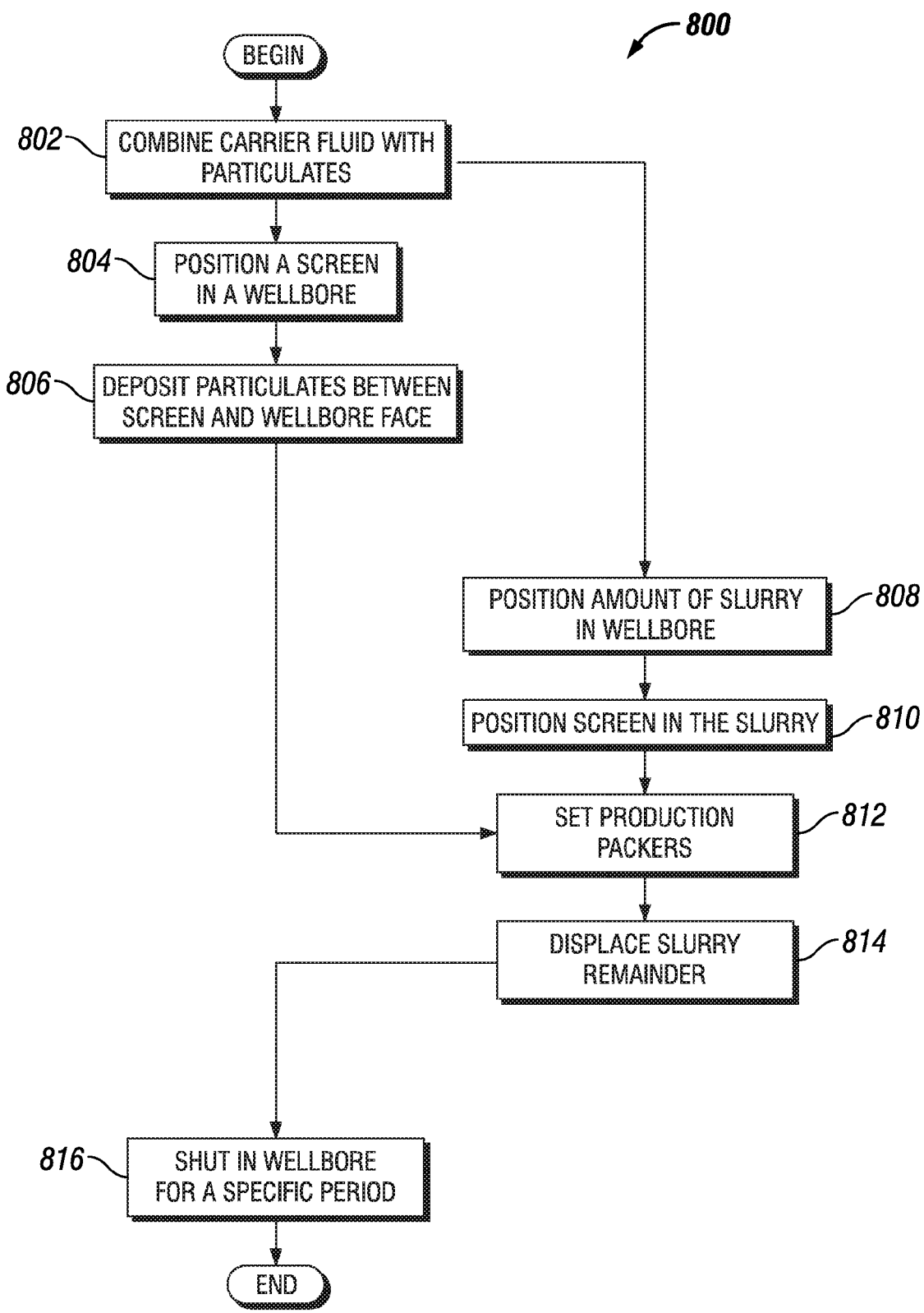
FIG. 8 is a schematic flow diagram of a technique for low damage gravel packing.

FIG. 8 is a schematic flow diagram of a technique 800 for low damage gravel packing. The technique 800 includes an operation 802 to combine a carrier fluid, a first amount of particulates, a second amount of particulates, and/or a third amount of particulates into a slurry. The first amount of particulates have a first average size distribution, the second amount of particulates have a second average size distribution, and the third amount of particulates have a third average size distribution. The first average size distribution is at least three times larger than the second average size distribution, and the first amount of particulates comprise non-deformable particulates. The second average size distribution is at least three times larger than the third average size distribution. The technique 800 in one embodiment further includes an operation 804 to position a screen in a wellbore, and an operation 806 to deposit each of the amounts of particulates between an outer surface of the screen and a surface of the wellbore, and in another embodiment, includes operations 808 to position an amount of slurry in the wellbore, and operations 810 to position the screen in the amount of slurry. In certain embodiments, the technique 800 includes operations 812 to set a production packer and operations 814 to displace a slurry remainder inside the screen.

In certain embodiments, the simplified operations (relative to currently available gravel packing operations) of placing the slurry 116 in the wellbore and the screen 112 into the slurry allow a very low carrier fluid 122 viscosifier loading and require a high particulate loading (as in certain embodiments excess carrier fluid 122 is not pumped into the formation of interest 106). In certain embodiments, the carrier fluid 122 includes viscosifiers at less than 20 lb/1000 gals, and total particulate loadings above 30 ppg. In certain embodiments, the slurry 116 includes particulate amounts (for the first, second, third, fourth, and/or fifth amount of particulates) and sizes such that the packed volume fraction (PVF) for the slurry 116 is greater than 0.75 PVF, or in some embodiments greater than 0.8 PVF.

Displacing the slurry remainder inside the screen includes circulating out particulates inside the screen 112, and/or flowing formation fluid from the formation of interest 106 and thereby carrying any slurry remainder out of the screen 112. In certain embodiments, at least one of the second and third particulate amounts comprise a degradable material, and the technique 800 further includes an operation 816 to shut in the wellbore for a specified time period. In certain embodiments, the specified time period may be a time period selected such that various degradation and breaking reactions have time to occur before flowing fluids out of the wellbore.

As is evident from the figures and text presented above, a variety of embodiments are contemplated.

In certain embodiments, a method includes combining a carrier fluid, a first amount of particulates, and a second amount of particulates into a slurry. The first amount of particulates have a first average size distribution and the second amount of particulates have a second average size distribution, the first average size distribution is at least three times larger than the second average size distribution, and the first amount of particulates comprise non-deformable particulates. In certain embodiments, the method further includes positioning a screen in a wellbore, and circulating the slurry through the wellbore such that the first amount of particulates and the second amount of particulates are deposited on an outer surface of the screen.

In certain further embodiments, the method further includes combining a third amount of particulates with the slurry, wherein the third amount of particulates have a third average size distribution, wherein the second average size distribution is at least three times larger than the third average size distribution. In certain further embodiments, the second amount of particulates and the third amount of particulates comprise a degradable material. In certain further embodiments, at least one of the first amount of particulates, the second amount of particulates, and the third amount of particulates comprise a tackifying agent. In certain embodiments, the second amount of particulates and/or the third amount of particulates includes a reactive solid that reacts with a hydrolysis product of the degradable material. In certain embodiments, at least one of the particulate amounts includes particles with an aspect ratio of less than one.

In certain embodiments, a degradable material includes a wax, an oil-soluble resin, and/or a material soluble in hydrocarbons. In certain embodiments, at least one of the first amount of particulates and the second amount of particulates include a reactive solid that reacts with a hydrolysis product of the degradable material. In certain further embodiments, the reactive solid includes ground quartz, oil soluble resin, degradable rock salt, clay, and/or zeolite. In certain further embodiments, the reactive solid includes magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and sodium calcium magnesium polyphosphate glass.

In certain embodiments, the carrier fluid is a brine, and the sum of the mass of the particulates is at least about 20 pounds per gallon of carrier fluid. In certain embodiments, the carrier fluid includes a viscosifier being present in an amount less than 20 lb per 1000 gallons of carrier fluid, and the sum of the mass of the particulates is at least about 23 pounds per gallon of carrier fluid.

In certain embodiments, a method includes combining a carrier fluid, a first amount of particulates, and a second amount of particulates into a slurry, where the first amount of particulates have a first average size distribution and the second amount of particulates have a second average size distribution, wherein the first average size distribution is at least three times larger than the second average size distribution, and wherein the first amount of particulates comprise non-deformable particulates. In certain embodiments, the method further includes positioning a screen in a wellbore and depositing the first amount of particulates and the second amount of particulates between an outer surface of the screen and a surface of the wellbore.

In certain further embodiments, the depositing includes: positioning an amount of the slurry in the wellbore, positioning the screen in the amount of slurry, setting a production packer, and displacing a slurry remainder inside the screen. In certain further embodiments, the screen includes a crossover sleeve, and the depositing further includes positioning the screen in the wellbore, circulating the slurry through the screen from the outer surface to the inner surface of the screen through the crossover sleeve, and closing the crossover sleeve. In certain further embodiments, the second amount of particulates comprise a degradable material, further comprising shutting in the wellbore for a specified time period.

In certain embodiments, a system includes a slurry including a carrier fluid suspending a first amount of particulates and a second amount of particulates. The first amount of particulates have a first average size distribution and the second amount of particulates have a second average size distribution. The first average size distribution is between three times and fifteen times larger than the second average size distribution, and the first amount of particulates include non-deformable particulates. The system further includes a screen disposed in a wellbore, and means for depositing the first amount of particulates and the second amount of particulates between the screen and the wellbore.

In certain embodiments, the system further includes the carrier fluid suspending a third amount of particulates, where the third amount of particulates have a third average size distribution, and where the second average size distribution is between three times and fifteen times larger than the third average size distribution. In certain further embodiments, the carrier fluid further suspends a fourth amount of particulates, where the fourth amount of particulates have a fourth average size distribution, and where the third average size distribution is between three times and fifteen times larger than the fourth average size distribution. In certain further embodiments, the system includes a carrier fluid further suspending a fifth amount of particulates, where the fifth amount of particulates have a fifth average size distribution, and where the fourth average size distribution is between three times and fifteen times larger than the fifth average size distribution.

In certain embodiments, the system includes the second amount of particulates and/or the third amount of particulates including a degradable material. In certain embodiments, the degradable material includes at least one material selected from the list consisting of: a lactide, a glycolide, an aliphatic polyester, a poly(lactide), a poly(glycolide), a poly($\epsilon$-caprolactone), a poly(orthoester), a poly(hydroxybutyrate), an aliphatic polycarbonate, a poly(phosphazene), and a poly(anhydride). In certain embodiments, the degradable material includes at least one member selected from the list consisting of: a poly(saccharide), dextran, cellulose, chitin, chitosan, a protein, a poly(amino acid), a poly(ethylene oxide), and a copolymer including poly(lactic acid) and poly(glycolic acid). In certain embodiments, the degradable material includes a copolymer including a first moiety comprising at least one member selected from the functional groups consisting of a hydroxyl group, a carboxylic acid group, and a hydrocarboxylic acid group, the copolymer further including a second moiety comprising at least one of glycolic acid and lactic acid.

In certain embodiments, the carrier fluid includes a brine, and wherein the sum of the mass of the particulates is at least about 20 pounds per gallon of carrier fluid. In certain embodiments, the carrier fluid includes a viscosifier being present in an amount less than 20 lb per 1000 gallons of carrier fluid, and wherein the sum of the mass of the particulates is at least about 23 pounds per gallon of carrier fluid. In certain embodiments, the carrier fluid includes a hydratable gelling agent being present in an amount less than 18 lb gel per 1000 gallons of carrier fluid, and wherein the sum of the mass of the particulates is at least about 23 pounds per gallon of carrier fluid.

In certain embodiments, a system includes a slurry including a carrier fluid suspending a first amount of particulates, a second amount of particulates, and a third amount of particulates. In certain embodiments, the first amount of particulates has a first average particle volume, the second amount of particulates has a second average particle volume, and the third amount of particulates has a third average particle volume. In certain further embodiments, the first average particle volume includes an average particle volume between 27 ($3^3$) and 3375 ($15^3$) times larger than the second average particle volume, and the second average particle volume includes an average particle volume between 27 ($3^3$) and 3375 ($15^3$) times larger than the third average particle volume. In certain embodiments, the system further includes a screen disposed in a wellbore, and a means for depositing the first amount of particulates, the second amount of particulates, and the third amount of particulates between the screen and a surface of the wellbore.

In certain embodiments, the carrier fluid comprises one of a brine and a viscosifier being present in an amount less than 20 lb per 1000 gallons of carrier fluid, and the sum of the mass of the particulates is greater than 20 pounds per gallon of carrier fluid. In certain embodiments, the sum of the mass of the particulates is greater than 30 pounds per gallon of carrier fluid.

In certain embodiments, the first average size distribution comprises a median size of about 840 µm, wherein the second average size distribution comprises a median size of about 150 µm, and wherein the third average size distribution comprises a median size of about 15 µm, wherein each median size comprises a characteristic dimension. In certain embodiments, the system further includes the first amount of particulates, second amount of particulates, and third amount of particulates have a combined dry packing volume fraction greater than 0.75 or greater than 0.8. In certain embodiments, the means for depositing the first amount of particulates, the second amount of particulates, and the third amount of particulates between the screen and a surface of the wellbore includes means for positioning the slurry in the wellbore, means for positioning the screen in the slurry, and means for removing remainder carrier fluid from the slurry.

While the invention has been illustrated and described in detail in the drawings and foregoing description, the same is to be considered as illustrative and not restrictive in character, it being understood that only some embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   combining a carrier fluid, a first amount of particulates, a second amount of particulates, and a third amount of particulates into a slurry;
   wherein the first amount of particulates have a first average size distribution, the second amount of particulates have a second average size distribution, and the third amount of particulates have a third average size distribution, wherein the first average size distribution is at least three times larger than the second average size distribution, and wherein second average size distribution is at least three times larger than the third average size distribution;
   wherein at least one of the second amount of particulates and the third amount of particulates comprise a degradable material and wherein at least one of the second amount of particulates and the third amount of particulates includes a reactive solid;
   positioning a screen in a wellbore; and,
   circulating the slurry through the wellbore such that the first amount of particulates, the second amount of particulates, and the third amount of particulates are deposited on an outer surface of the screen.

2. The method of claim 1, wherein the reactive solid reacts with at least one of the degradable material and a hydrolysis product of the degradable material.

3. The method of claim 1, wherein at least one of the first amount of particulates, the second amount of particulates, and the third amount of particulates comprise a tackifying agent.

4. The method of claim 1 wherein at least one of the second amount of particulates and the third amount of particulates include the degradable material and a coating.

5. The method of claim 4, wherein at least one of the second amount of particulates and the third amount of particulates include a material structured to degrade the coating.

6. The method of claim 1, wherein the degradable material comprises at least one member selected from the group consisting of a wax, an oil-soluble resin, and a material soluble in hydrocarbons.

7. The method of claim 1, wherein the second amount of particulates comprise particles with an aspect ratio of less than one.

8. The method of claim 1, wherein the reactive solid comprises at least one member selected from the group consisting of ground quartz, oil soluble resin, degradable rock salt, clay, and zeolite.

9. The method of claim 1, wherein the reactive solid comprises at least one member selected from the group consisting of magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and sodium calcium magnesium polyphosphate glass.

10. The method of claim 1, wherein the carrier fluid comprises a brine, and wherein the sum of the mass of the particulates is at least about 20 pounds per gallon of carrier fluid.

11. The method of claim 1, wherein the carrier fluid comprises a viscosifier being present in an amount less than about 20 lb per 1000 gallons of carrier fluid, and wherein the sum of the mass of the particulates is at least about 23 pounds per gallon of carrier fluid.

12. A system, comprising:
a slurry comprising a carrier fluid suspending a first amount of particulates, a second amount of particulates, and a third amount of particulates;
wherein the first amount of particulates have a first average size distribution, the second amount of particulates have a second average size distribution, and the third amount of particulates have a third average size distribution, wherein the first average size distribution is between three times and fifteen times larger than the second average size distribution, wherein the second average size distribution is between three times and fifteen times larger than the third average size distribution;
wherein at least one of the second amount of particulates and the third amount of particulates comprise a degradable material, and wherein at least one of the second amount of particulates and the third amount of particulates includes a reactive solid;
a screen disposed in a wellbore; and
means for depositing the first amount of particulates, the second amount of particulates, and the third amount of particulates between the screen and the wellbore.

13. A system, comprising:
a slurry comprising a carrier fluid suspending a first amount of particulates, a second amount of particulates, and a third amount of particulates;
wherein the first amount of particulates have a first average size distribution, the second amount of particulates have a second average size distribution, and the third amount of particulates have a third average size distribution;
wherein the first average size distribution is at least three times larger than the second average size distribution, and wherein the second average size distribution is at least three times larger than the third average size distribution;
wherein at least one of the second amount of particulates and the third amount of particulates comprise a degradable material, and wherein at least one of the second amount of particulates and the third amount of particulates includes a reactive solid structured to react with at least one of the degradable material and a hydrolysis product of the degradable material;
a screen disposed in a wellbore; and
means for depositing the first amount of particulates, the second amount of particulates, and the third amount of particulates between the screen and a surface of the wellbore.

14. A method, comprising:
combining a carrier fluid, a first amount of particulates, a second amount of particulates, and a third amount of particulates into a slurry;
wherein the first amount of particulates have a first average size distribution, the second amount of particulates have a second average size distribution, and the third amount of particulates have a third average size distribution, wherein the first average size distribution is at least three times larger than the second average size distribution, and wherein second average size distribution is at least three times larger than the third average size distribution;
wherein at least one of the second amount of particulates and the third amount of particulates comprise a degradable material and wherein at least one of the second amount of particulates and the third amount of particulates includes a reactive solid; and
positioning a screen in a wellbore and circulating the slurry through the wellbore in any order such that the first amount of particulates, the second amount of particulates, and the third amount of particulates are deposited between the screen and the wellbore.

15. The method of claim 14, wherein the positioning and circulating comprise placing the slurry in the wellbore and positioning the screen in the slurry.

16. The method of claim 15, wherein a sum of all particulates in the slurry exceeds thirty pounds per gallon of carrier fluid.

17. The method of claim 15, wherein the first average size distribution is between about six and ten times larger than the second average size distribution.

18. The method of claim 15, wherein the second amount of particulates comprises a degradable material, the method further comprising shutting in the wellbore for a specified time period.

19. The method of claim 18, wherein the second amount of particulates further comprises a coating, wherein the coating is structured to degrade within the specified time period.

20. The method of claim 15, wherein at least one of the first amount of particulates and the second amount of particulates comprises a formation face damage removal agent.

21. The method of claim 14, wherein the screen is disposed into the wellbore before the slurry is circulated.

22. The method of claim 14, wherein the slurry is circulated into the wellbore before the screen is disposed in the wellbore.

23. The method of claim 14, wherein the first amount of particulates and the second amount of particulates have a combined dry packing volume fraction greater than about 0.75.

24. The method of claim 14, wherein the slurry is combined prior to circulation in the wellbore.

25. A system, comprising:
a slurry comprising a carrier fluid suspending a first amount of particulates, a second amount of particulates, and a third amount of particulates;
wherein the first amount of particulates have a first average size distribution, the second amount of particulates have a second average size distribution, and the third amount of particulates have a third average size distribution, wherein the first average size distribution is between three times and fifteen times larger than the second average size distribution, wherein the second average size distribution is between three times and fifteen times larger than the third average size distribution;
wherein at least one of the second amount of particulates and the third amount of particulates comprise a degradable material, and wherein at least one of the second amount of particulates and the third amount of particulates includes a reactive solid; and
a tubing string and a slurry pump to position a screen and circulate the slurry in the wellbore in any order such that the first amount of particulates, the second amount of particulates, and the third amount of particulates are deposited between the screen and the wellbore.

26. The system of claim 25, the carrier fluid further suspending a fourth amount of particulates, wherein the fourth amount of particulates have a fourth average size distribution, wherein the third average size distribution is between three times and fifteen times larger than the fourth average size distribution.

27. The system of claim 26, the carrier fluid further suspending a fifth amount of particulates, wherein the fifth amount of particulates have a fifth average size distribution, wherein the fourth average size distribution is between three times and fifteen times larger than the fifth average size distribution.

28. The system of claim 25, wherein the reactive solid is structured to react with at least one of the degradable material and a hydrolysis product of the degradable material.

29. The system of claim 25, wherein the degradable material comprises at least one material selected from the list consisting of: a lactide, a glycolide, an aliphatic polyester, a poly(lactide), a poly(glycolide), a poly(ε-caprolactone), a poly(orthoester), a poly(hydroxybutyrate), an aliphatic polycarbonate, a poly(phosphazene), and a poly(anhydride).

30. The system of claim 25, wherein the degradable material comprises at least one member selected from the list consisting of: a poly(saccharide), dextran, cellulose, chitin, chitosan, a protein, a poly(amino acid), a poly(ethylene oxide), and a copolymer including poly(lactic acid) and poly(glycolic acid).

31. The system of claim 30, wherein the degradable material comprises a copolymer including a first moiety comprising at least one member selected from the functional groups consisting of a hydroxyl group, a carboxylic acid group, and a hydrocarboxylic acid group, the copolymer further including a second moiety comprising at least one of glycolic acid and lactic acid.

32. The system of claim 25, wherein the carrier fluid comprises a brine, and wherein the sum of the mass of the particulates is at least about 20 pounds per gallon of carrier fluid.

33. The system of claim 25, wherein the carrier fluid comprises a viscosifier being present in an amount less than about 20 lb per 1000 gallons of carrier fluid, and wherein the sum of the mass of the particulates is at least about 23 pounds per gallon of carrier fluid.

34. The system of claim 25, wherein the carrier fluid comprises a hydratable gelling agent being present in an amount less than about 18 lb gel per 1000 gallons of carrier fluid, and wherein the sum of the mass of the particulates is at least about 23 pounds per gallon of carrier fluid.

35. A system, comprising:
a slurry comprising a carrier fluid suspending a first amount of particulates, a second amount of particulates, and a third amount of particulates;
wherein the first amount of particulates have a first average size distribution, the second amount of particulates have a second average size distribution, and the third amount of particulates have a third average size distribution;
wherein the first average size distribution is at least three times larger than the second average size distribution, and wherein the second average size distribution is at least three times larger than the third average size distribution;
wherein at least one of the second amount of particulates and the third amount of particulates comprise a degradable material, and wherein at least one of the second amount of particulates and the third amount of particulates includes a reactive solid structured to react with at least one of the degradable material and a hydrolysis product of the degradable material; and
a tubing string and a slurry pump to position a screen and circulate the slurry in a wellbore in any order such that the first amount of particulates, the second amount of particulates, and the third amount of particulates are deposited between the screen and a surface of the wellbore.

36. The system of claim 35, wherein the first average size distribution is between about six times and about ten times larger than the second average size distribution.

37. The system of claim 35, wherein at least one of the second amount of particulates and the third amount of particulates comprises a formation face damage removal agent.

38. The system of claim 37, wherein the formation face damage removal agent comprises an agent to remove at least one damage type selected from the list consisting of a gravel pack fluid filter cake, a drilling mud filter cake, a fluid loss agent, and a drilling mud pill residue.

* * * * *